J. H. RYDER.
TIRE.
APPLICATION FILED MAY 31, 1919. RENEWED JAN. 6, 1922.

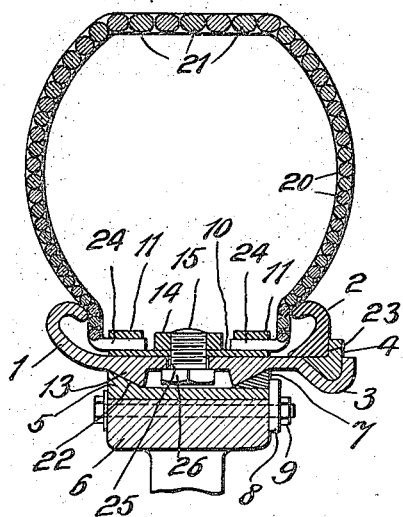
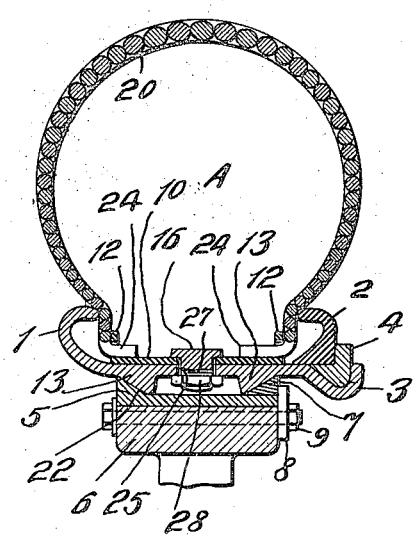

INVENTOR
JOHN HENRY RYDER
BY
ATTORNEY

UNITED STATES PATENT OFFICE.

JOHN HENRY RYDER, OF BROOKLYN, NEW YORK, ASSIGNOR TO STANDARD WIRE TIRE CORPORATION, OF NEW YORK, N. Y., A CORPORATION OF NEW YORK.

TIRE.

1,424,855.  Specification of Letters Patent.  Patented Aug. 8, 1922.

Application filed May 31, 1919, Serial No. 300,956.  Renewed January 6, 1922.  Serial No. 527,513.

*To all whom it may concern:*

Be it known that I, JOHN HENRY RYDER, a citizen of the United States, and a resident of Brooklyn, State of New York, have invented certain new and useful Improvements in Tires, of which the following is a specification.

This invention refers to flexible tires for the wheels of automobiles and other vehicles, and consists essentially in improvements in tires comprising a flexible metallic tube-like structure composed of a multiplicity of flexible wire strands tapered from the middle toward each end, which strands conform to an arrangement thereof in curved arches whose members will be in contact each with those adjacent thereto at all points from the tread surfaces of the tire around the contour of the tire to the rim, the opposite ends of each strand or wire being some distance from each other, since each strand lies in a curved oblique position across the tire, and said ends of each strand being secured to the rim of the wheel by improved means. For this purpose, I have devised certain novel features of construction and combinations in the support of the wires as well as in the flexible tapered wires. The invention, therefore, consists essentially in the construction, arrangement, and combination of parts, substantially as will be hereinafter described and then more fully pointed out in the claims.

In the accompanying drawing illustrating my invention:

Figure 1 is a cross-section of my improved tire;

Fig. 2 is a transverse section of a modified form of the invention;

Fig. 3 is a partial plan view of the rim of the wheel showing one of the wire strands in place and indicating where it is attached;

Similar characters of reference designate corresponding parts throughout the different figures of the drawing.

Figure 4:
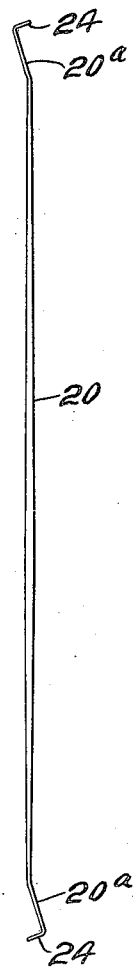
Figure 4 is a detail view of one of the tapered wire strands.

Although the present means for supporting and holding the tapered wires in close contact with each other may be applied and related to many different forms of clincher and other rims, yet I have shown certain specimens of mechanism for this purpose, but without the intention of restricting the invention thereto, the same being offered merely by way of illustration and explanation.

6 denotes the felloe of the wheel, either of wood or any other material, to which the spokes are attached, which lead to the hub. Encircling this felloe is a metallic ring 5 having at one edge an inwardly inclined face 22 and surrounded at its opposite edge with an independent bevel-faced ring 7, which parts are held in place by the bolts 9 and plates 8, said bolts passing through the felloe 6.

The clincher rim which surrounds the bevel-faced rings 5 and 7 has its inside face provided with oppositely inclined circular faces 13 which come in contact with the beveled faces of the rings 5 and 7, all as clearly indicated in Figures 1 and 2. This clincher rim is provided moreover at one edge with a flange 1 and is surrounded on its other edge with a detachable flange 2 which is held in place by a ring 4 which is adapted to be seated in a grooved flange 3 on the edge of the clincher rim opposite to the flange 1. The grooved flange 3 is inwardly curved as shown, and the ring 4 which is seated therein is correspondingly curved and also has a right-angled shoulder at 23, which receives a correspondingly-shaped edge of the ring 2. This ring 2 is pressed against the ends of the wire strands 20 and locked in place by forcing the locking ring 4 to its seat between the grooved flange 3 and said flanged ring 2.

Inside of the clincher rim and concentric therewith, being seated between the flanges 1 and 2, is a circular supporting ring 10, near the opposite edges of which are provided perforated strips 11 that are welded to the plate 10, as shown in the drawings, so that a series of openings is provided by and in these strips 11 which will receive the right-angled ends 24 of the wire strands 20 when the latter occupy the position shown by the single strand 20 in Figure 3 and by the group of wire strands indicated in Figures 1 and 2. In Figure 1 I have also indicated the ring 10 as provided with central plates 14 of greater or less size, which are welded thereto and which form as it were nuts to receive the bolts 15 which screw thereinto and each bolt is passed through an opening 25 in the clincher rim so that the head 26 of said bolt may be in a recess between the inclined faces 13 of the clincher rim and thus securely fasten the ring 10 to the clincher rim and prevent any creeping or displacement of said ring 10 during the operation of the tire.

In Figure 3 I have shown a portion of the rim and the wire-supporting ring together with a single strand of wire 20, it being understood that the tire is made up of a multiplicity of these wires, as shown in Figures 1 and 2, which taper from the middle point toward each end. A single strand laid out in the position that it occupies before being bent is shown in Fig. 4. There it will be noted that the wire is largest at the middle point and tapers therefrom toward each end. Near each end it is bent at an angle to form a portion 20$^a$, the portion 20$^a$ at one end being inclined in a certain direction on one side of the axis of the wire 20, and the portion 20$^a$ at the other end being inclined in the same direction but on the other side of the axis of the wire 20, while at each end of the angular portions 20$^a$ there is a right-angled bend 24 which forms a part of proper length to engage transverse passages in the strips 11 at the edge of the plate 10 or in the flanges 12 at the edges of said plate. These wires 20 are placed close to each other, as shown in Figures 1 and 2, and form an arch or crown construction for the tire, giving it a hollow or tube-like character, the tread portion being somewhat thicker or thinner accordingly as the strands are made of greater or less diameter at their middle portions. The tread may be more or less flattened at this thick part, as is indicated in Figure 1, depending, of course, upon the material and mode of bending, or it may partake of the regular curvature of the strands, as shown in Figure 2. Each strand, when it is put into place is not only bent into the form of a loop to carry it from one edge of the rim of the wheel to the other edge, but it is also given a torsional twist. It will be further noted that the bending of each strand is in a spiral direction, the center of the spiral being the center of the tube that forms the tire structure, as indicated at A in Figure 2. It will be noted that the ends of these tapered strands 20 are not opposite to each other, but are some distance apart, the distance amounting in many cases to a quarter or a third of the circumference of the wheel, so that in this way the middle or larger or thicker portions of the strands 20 which form the tread of the tire are more or less longitudinal in their position, but they all form the spirally-wound envelope which encircles the periphery of the wheel and whose circular axial line is the center of the curvature of the spiral bendings of the individual strands. It is essential that these tapered strands should be held firmly and strongly at their ends and not allowed to get out of place, but be kept all the time in close contact with each other so that no foreign substances such as sand, dirt, or moisture may be able to pass between them, there being no interstices or openings to permit anything of this kind. When the ends 24 of the strands are bent as described and such ends 24 inserted in the orifices or openings in the edges of the supporting ring 10, the torsional spiral twist of the strands will hold the ends in the ring 20 so that there will be a very firm connection of the parts, which will not easily become disordered.

In the assembling of the parts if we assume that the ends 24 of the tapered wires 20 are first introduced into the passages in the strip 11 alongside of the clincher flange 1 and the opposite ends 24 are left free until after these first ends have been inserted, it will then be necessary to introduce these other ends one by one in the openings in the other strip 11 alongside the detachable flange 2. When these ends are inserted one by one, the flange 2 will be pressed against them to force them home, and at the same time the locking flange 4 will be forced between the flanged ring 2 and the clincher flange 3, and when this locking ring 4 is pressed tightly and firmly in position as shown in Figure 1, the flanged ring 2 will be so held tightly against the ends of the tapered wires 20 that the latter will be effectually locked in position and the assembling of all the parts throughout will thus be completed in a strong and working form, every part of the combination being tightly locked in place. It will be understood, however, that the torsional and spiral twisting of the wires 20 and the engagement of the ends thereof with the openings in the members 11 on the ring 10 will be sufficient to keep the wires in place without the pressure of the clincher or other flanges, inasmuch as the angular ends 20$^a$ carrying the bent ends 24 will, when engaging the ring 10, have a strong pull toward each other, which will hold them in position and, therefore, it is possible to use the tire thus made up of a supporting perforated ring 10 and a series of bent strands without any auxiliary means for keeping the strands in the ring, so that the combination of the supporting ring and the strands may be applied with any kind of rim, no matter what sort of flange it has and whether it is demountable or detachable, or of any other construction. The rim, therefore, may be of any standard or other type with the detachable flanges as shown, or for no-rim cut tire beads, or otherwise.

In Figure 2 I have shown a slight modification in the construction of some of the parts for here instead of welding separate strips 11 to the edges of the ring 10 for the purpose of providing openings to receive the ends 24 of the tapered wires 20, I simply bend the edges of the plate 10 at right angles to provide flanges 12 and perforate these flanges to furnish openings to receive the ends 24 of the tapered wires. This is a simple and practical construction which will be found to be successful in operation. Also, with this modification instead of welding plate 14 to the ring 10 and using a bolt 15, I simply use a strap 16 which may be welded at one end to the plate 10 and which is provided with a projection 27 engaging the opening 25 in the clincher rim, and provided or not, as may be desired, with a nut 28 on the screw threaded inner end of said projection 27; but obviously these details may vary within wide limits, and I can utilize any kind of a device for preventing creeping of the parts with the same success.

Figure 5:
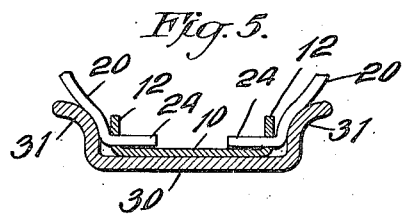
Figure 5 is a transverse section of my improvements applied to another form of wheel rim.
Figure 6:
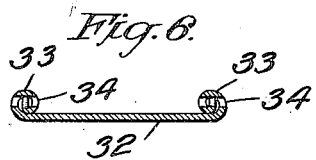
Figure 6 shows a section of the supporting ring formed with rolled edges.
Figure 7:
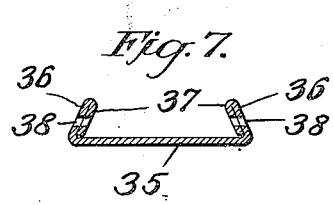
Figure 7 is a cross-section of the same ring formed with folded and inclined edges.

In Figure 5 I show a still further modification, presenting this time a different kind of rim, the same being a clincher 30 with outwardly curved side flanges 31 against which the strands 20 lie closely, having their ends 24, as before in Figure 2, engaging perforations in the bent flanges 12 of the ring 10. These outwardly curved flanges 31 will be found preferable to the rim shown in Figure 1 having the curved flanges 1 and 2 for many purposes, and I simply show this rim as another example. Furthermore, in Figure 6 I indicate another form of the supporting ring which is here shown as a member 32 having the edge thereof rolled or spun at 33 with one or more bends so as to make circumferential beads at the edges, this being a convenient method of manufacture and said beads when so formed being drilled with the necessary series of perforations 34 for the reception of the ends 24 of the wires 20. In Figure 7 I show a still further modification, the supporting ring 35 being bent at the edges with inwardly-inclined bends 36, which are doubled back on themselves at 37 to provide flanges which are also perforated at 38.

Many changes in the precise construction and arrangement of the parts may obviously be made within the limits of the invention, and I do not wish to be confined to what I have here portrayed and described as there are so many changes which can be easily made therein and which I desire to reserve the right to make.

Having thus described my invention, what I claim as new and desire to secure by Letters Patent is:

1. In a tire, the combination of a multiplicity of resilient double-tapered wires closely associated with each other, and each having a torsional spiral twist whose center is the center of the tire, and an auxiliary ring having perforated edges to provide anchoring means for holding the bent ends of said tapered wires.

2. In a tire, the combination of a series of tapered wires adapted to be torsionally and spirally bent from one edge of the tire to the other in the form of a series of crowns that are closely associated with each other so as to constitute a flexible tubular tire, the center of the spiral twist being the center of said tubular tire, and a supporting ring for said wires having lateral flanges provided with a series of openings to receive the bent ends of the tapered wires.

3. In a tire, the combination of a multiplicity of resilient double-tapered wires closely associated with each other, and each having a torsional spiral twist whose center is the center of the tire, and means for keeping the ends of said wires in position, the opposite ends of the same strand being circumferentially distant from each other.

4. In a tire, the combination of a plurality of tapered wires forming a series of arches constituting the tread, each having a torsional spiral twist whose center is the center of the tire, and a ring supporting said wires, the opposite ends of each strand being distant from each other a substantial portion of the circumference of the tire.

In witness whereof, I have signed my name to the foregoing specification.

JOHN HENRY RYDER.